INVENTORS
WILLIAM L. LANKFORD, JR.,
HOWARD E. MATHIS,
JESSe CLIFTON KELLER,
LARRY G. BOWMAN,
ROY L. VAN WINKLE

BY
ATTORNEY William S. Dorman

INVENTORS
WILLIAM L. LANKFORD, JR.,
HOWARD E. MATHIS,
JESSE CLIFTON KELLER,
LARRY G. BOWMAN,
ROY L. VAN WINKLE

BY William S. Dorman
ATTORNEY

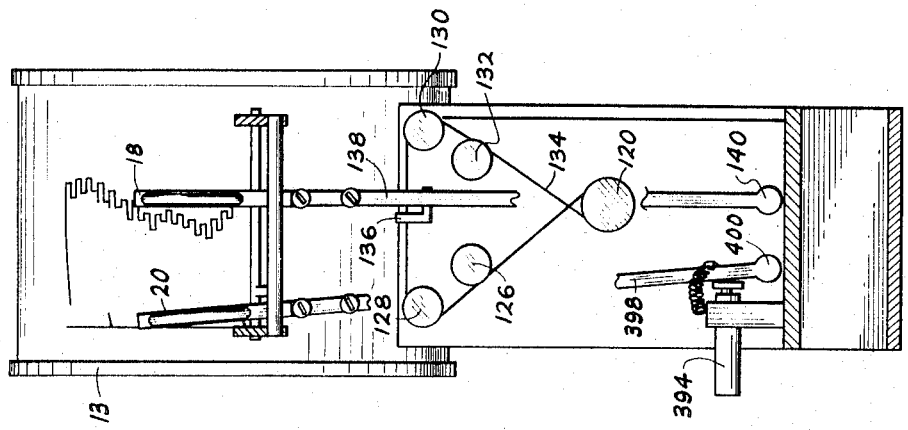
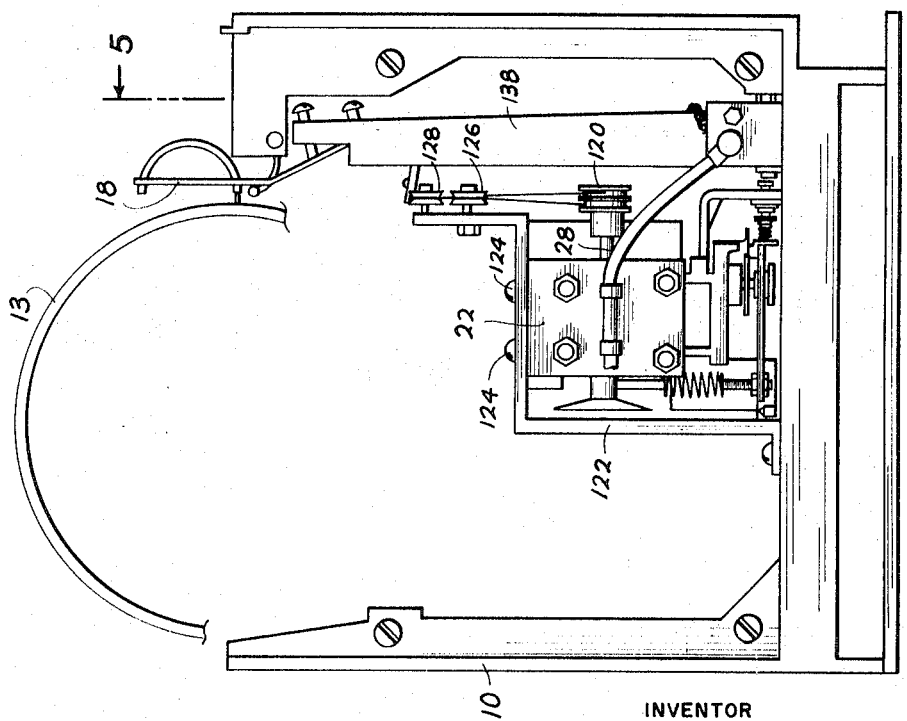

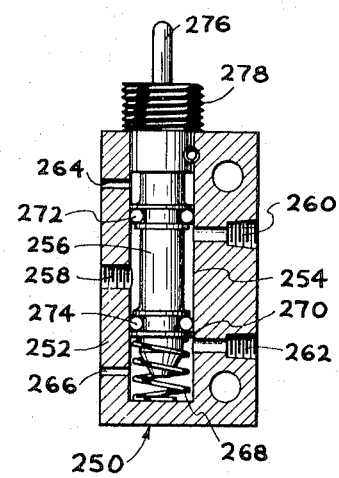
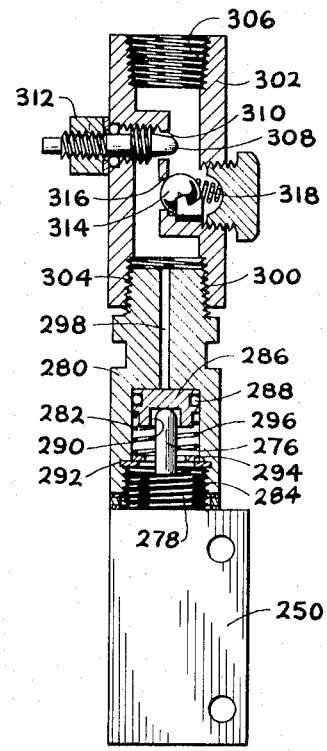
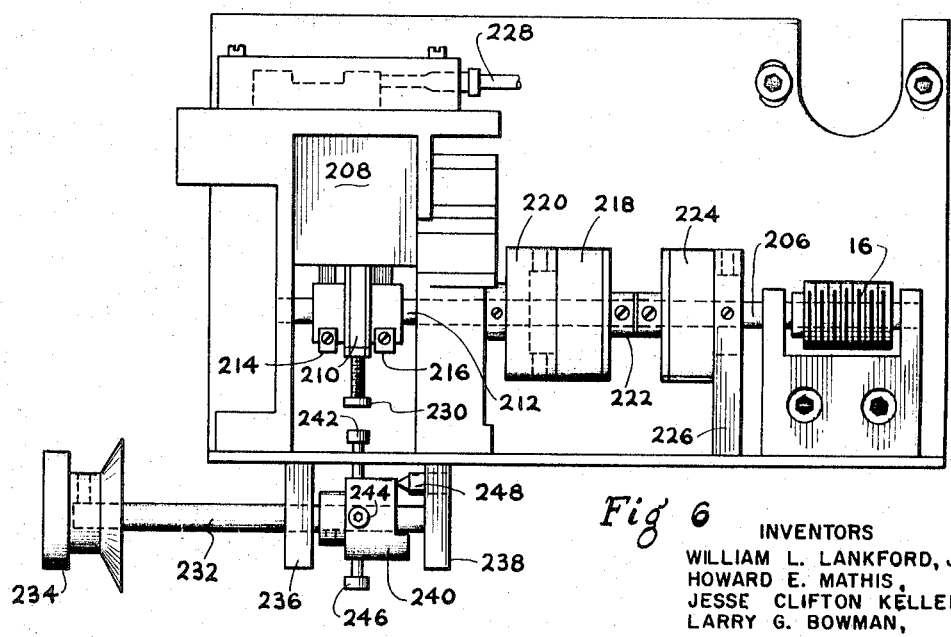

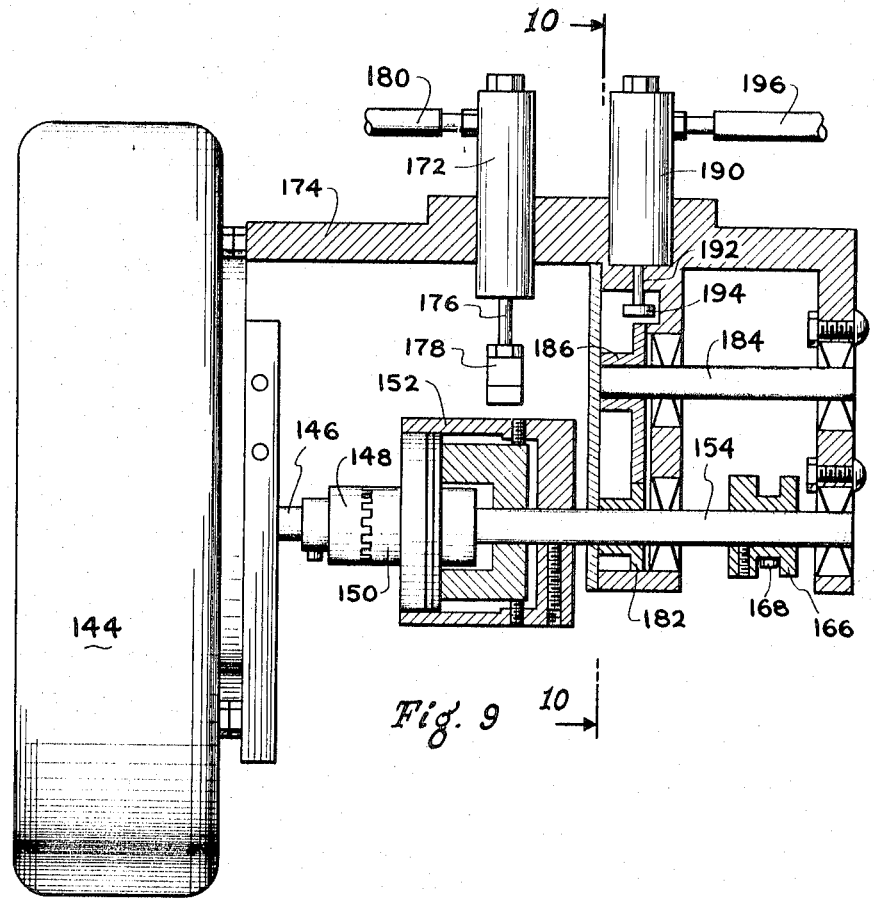
Fig. 9
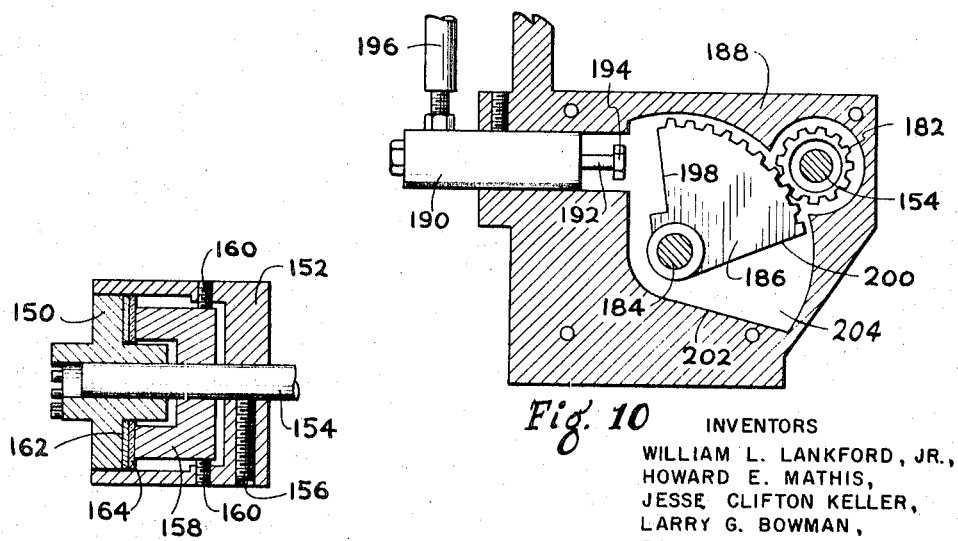
Fig. 11
Fig. 10
INVENTORS
WILLIAM L. LANKFORD, JR.,
HOWARD E. MATHIS,
JESSE CLIFTON KELLER,
LARRY G. BOWMAN,
ROY L. VAN WINKLE
BY
ATTORNEY William S. Dorman Oct. 17, 1967  W. L. LANKFORD, JR., ETAL  3,348,231
PNEUMATIC WELL DEPTH RECORDER Filed Sept. 13, 1965  9 Sheets-Sheet 7

INVENTORS
WILLIAM L. LANKFORD, JR.,
HOWARD E. MATHIS,
JESSE CLIFTON KELLER,
LARRY G. BOWMAN,
ROY L. VAN WINKLE

BY
ATTORNEY  William S. Dorman

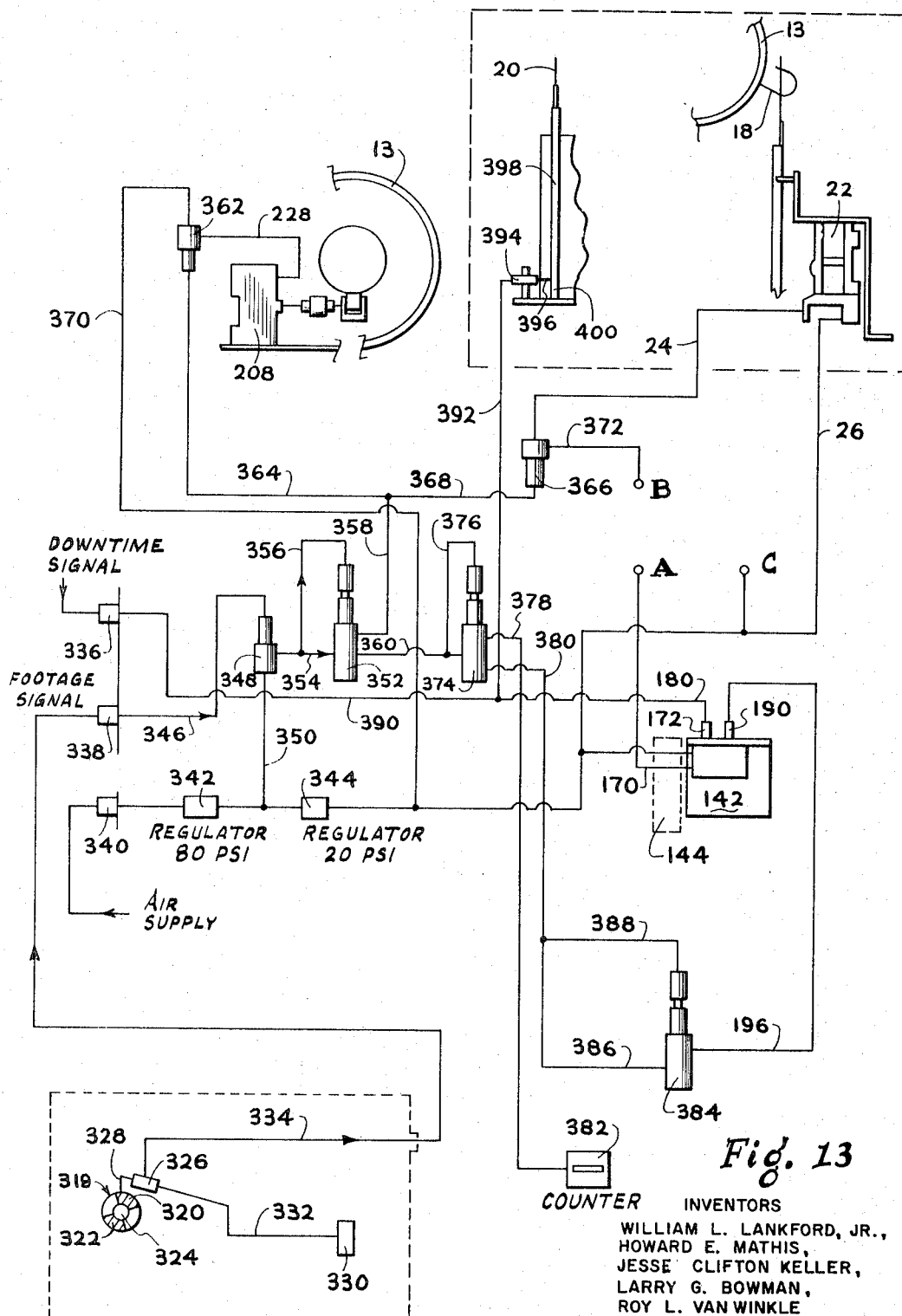

INVENTORS
WILLIAM L. LANKFORD, JR.,
HOWARD E. MATHIS,
JESSE CLIFTON KELLER,
LARRY G. BOWMAN,
ROY L. VAN WINKLE

BY
ATTORNEY William S. Dorman

United States Patent Office 3,348,231
Patented Oct. 17, 1967

3,348,231
PNEUMATIC WELL DEPTH RECORDER
William L. Lankford, Jr., Howard E. Mathis, Jesse Clifton Keller, Larry G. Bowman, and Roy L. Van Winkle, Oklahoma City, Okla., assignors to The Geolograph Company, Oklahoma City, Okla., a corporation of Oklahoma
Filed Sept. 13, 1965, Ser. No. 486,957
9 Claims. (Cl. 346—33)

ABSTRACT OF THE DISCLOSURE

A recorder of the type having a chart which is advanced intermittently and relatively vertically, a recording pen movable generally horizontally across the chart, pneumatic means for moving the pen from a vertical reference line along the left hand side of the chart towards the right through a distance commensurate with the time required to drill a given increment, a pneumatic circuit associated with the recorder for retaining the pen in its position at the end of a given drilling increment and for moving the pen inwardly or outwardly thereafter to a position corresponding to the elapsed time for the next drilling increment.

---

This invention relates to improvements in recording apparatus and more particularly, but not by way of limitation, to improvements in recording apparatus of the type disclosed in U.S. Patents Nos. 2,981,102 and 3,124,410.

The recorder of the type disclosed in the above mentioned patents generally involves a chart which is advanced intermittently, or step-wise, in a direction which can be considered vertical for the sake of this description. The chart may be mounted on a drum as in the case of Patent No. 3,124,410 or it may be mounted between two rollers and movable over a platen as in Patent No. 2,981,102. The recording pen in the above mentioned patents is movable horizontally from a vertical reference line along the left hand side of the chart towards the right through a distance commensurate with the time required to drill a foot, for example. Thus, at the beginning of a given foot, the chart having been advanced step-wise, the pen commences to move across the chart horizontally until the end of that given foot; at that time the chart is advanced and immediately thereafter the pen is returned to its left hand or zero reference position. The resulting trace is a series of horizontal lines connected at their outer right hand ends by short vertical lines, as shown in FIGURE 23 of Patent No. 2,981,102 and FIGURE 12 of Patent No. 3,124,410. If the advance of the chart and the release of the pen occur simultaneously, the result will be a series of saw-tooth traces. If the drum is advanced only after the pen returns to its zero reference position, the result will be a series of horizontal lines which will be unconnected at their right hand ends.

It will be noted, with regard to the action of the recording pen in the above mentioned recorder, that it is necessary for the pen to travel horizontally back to the zero reference position at the end of each increment of drilling; similarly, the pen must travel outwardly from the zero reference position for the entire period of drilling for the next increment. It would be desirable to eliminate the necessity for returning the pen to its zero reference position at the end of each increment of drilling; that is, if the pen could be retained in its position on the chart at the location representing the time for drilling a given increment and then, at the end of the next successive increment, merely moved outwardly or inwardly to a position representing the time required for this next successive increment, the result would be a single trace which would be a series of short vertical lines interconnected by relatively short horizontal lines; of course, if the time required for drilling a series of successive increments was constant, the resulting trace would be a vertical line only during that period of drilling that the time per increment remained constant.

The desirability of preventing the pen from returning to its zero reference line at the end of each given drilling increment has been recognized in the art and certain proposals and inventions have been proposed and perfected to this end. One such apparatus for preventing the return of the pen to its reference position at the end of each measured interval is disclosed in co-pending application Ser. No. 259,820, filed on Feb. 20, 1963, and entitled, "Operations Recorder," now Patent No. 3,216,019. The apparatus disclosed in the last mentioned patent application is of the electromechanical type and provides a single continuous trace as described above.

The present invention on the other hand provides a recording apparatus similar to that disclosed in the above mentioned patent application wherein the apparatus is operated pneumatically instead of electromechanically.

Briefly stated, the present invention includes a recorder having a chart adapted to be advanced step-wise, for example, in a relatively vertical direction. A recording pen is mounted for movement across said chart from a vertical zero reference line in a relatively horizontal direction. A pneumatic motor connected to this recording pen is adapted to move the pen towards the right from the zero reference line through a horizontal distance commensurate with the time required to drill a given foot; however, as will hereinafter appear in connection with a detailed description of this invention, the pneumatic circuit associated with this pneumatic motor is such that the pen is maintained in its position on the chart representing the time for the last increment of drilling and is moved outwardly or inwardly therefrom to a position representing the time required for the drilling of the next increment. The distance which the pneumatic motor moves the pen from the zero reference position or, stated differently, the ultimate position to which the pen is moved by the pneumatic motor, is dependent upon the pressure supplied to the pneumatic motor.

The present invention also includes a pneumatic transmitter which is driven by a timing device such as a mechanical clock. The timing device is adapted to provide a rotary mechanical input to the transmitter. The transmitter is internally constructed in such a way that it provides a variable output pneumatic pressure commensurate with the amount of rotation imparted to it from the timer. Means are provided to reset the rotary portion of the transmitter to its zero reference position in timed relation with the completion of a given increment of drilling. The output from the pneumatic transmitter is connected to the pneumatic motor intermittently. That is, after the completion of a given increment of drilling the output from the pneumatic transmitter is connected to the pneumatic motor such that the pen is moved outwardly or inwardly to reflect the time required to drill that particular increment; thereafter the output pressure from the transmitter is disconnected from the pneumatic motor while the input to the pneumatic motor is sealed off such that the pressure in the input line leading directly to the pneumatic motor remains the same as that last supplied thereto from the transmitter. However, at the end of the next successive increment of drilling the pneumatic motor is again connected to the pneumatic transmitter and its input pressure assumes the value of the output pressure from the transmitter at that time.

A second pneumatic motor is connected by means of various clutches, worm and worm gear to the shaft of the drum upon which the chart is mounted. A pulse, hereinafter referred to as a "footage pulse," is introduced to the recorder in timed relation with the completion of each foot of drilling. This footage pulse serves to operate the second pneumatic motor for advancing the chart. This footage pulse also serves to connect the pneumatic transmitter with the first pneumatic motor so as to move the pen to the position on the chart corresponding with the time required to drill the last foot. Thirdly, the footage pulse serves to operate a counter which records the total number of feet drilled and lastly, the footage pulse operates on the rotary portion of the pneumatic transmitter to return the same to its zero reference position.

The present invention also includes a second pen referred to herein as a "downtime" pen and a pneumatic piston-cylinder device for deflecting the pen. A downtime pulse is also provided to this recorder in timed relation with the cessation of the drilling operation. The downtime pulse serves to energize the piston-cylinder to deflect the downtime pen. The downtime pulse also energizes a braking device which bears against the rotary portion of the pneumatic transmitter to lock it into position.

The pneumatic circuit of the present invention includes, in addition to those components described above, various valves, a high-pressure source of air, an 80 p.s.i. pressure regulator, a 20 p.s.i. regulator and other components which will be described hereinafter.

The present invention also includes means to modify the mechanical output of the pneumatic motor which drives the chart drum. That is, the rotation of the chart drum can be varied to a greater or lesser degree to change the number of feet recorded on the chart drum for a given linear (vertical) distance along the chart.

The present invention also includes a pneumatic multiplier circuit which can be used on an optional basis to magnify the output from the pneumatic transmitter to the pneumatic motor which controls the footage pen. For example, is one set of circumstances, it may be desirable to have the full horizontal extent of movement to represent thirty minutes of drilling. Under another set of circumstances, for example, under slower conditions of drilling, it may be desirable to have the full horizontal distance represent ninety minutes of drilling. The pneumatic multiplier circuit can be connected in, on an optional basis as indicated above, between the output of the pneumatic transmitter and the input of the pneumatic motor which operates the footage pen.

By employing the components and mechanisms specifically disclosed in this application, a record chart will be produced wherein the ordinate represents feet or distance and the abscissa represents time. However, by feeding in other variables and making certain modifications in the components employed, the co-ordinates may be varied also. For example, it is possible to substitute, for the footage pulse, a timed pulse such that the ordinate will now represent time; correspondingly, the pneumatic transmitter can be operated by a pawl and ratchet arrangement, or step-clutch arrangement such that the abscissa can represent feet, number of pump strokes, et cetera.

Therefore, it is a principal object of the present invention to provide a recorder of the type described above which will eliminate the return of the recording pen to its initial reference position at the end of each measured increment.

It is another object of the present invention to provide a recorder of the type described above which will be operated essentially pneumatically.

It is a further object of the present invention to provide a recorder of the type described above wherein the degree of chart advance may be varied with respect to a given input.

It is a further object of the present invention to provide a recorder of the type described above wherein the horizontal movement of the recording pen across the chart can be varied in multiples or sub-multiples with respect to a given measured value.

It is a further object of the present invention to provide a means for holding the pneumatic transmitter for the footage pen in a fixed position when a downtime pulse is received by the recorder.

Other and further objects and advantageous features of the present invention will hereinafter more fully appear in connection with a detailed description of the drawings in which:

FIGURE 4 is a view similar to FIGURE 3, on a reduced scale, with certain parts removed for the purpose of illustrating some of the internal components of the recording apparatus;

FIGURE 5 is a section view taken along section line 5—5 of FIGURE 4 showing, in semi-diagrammatic form, the pen arms and their operative means;

FIGURE 6 is a right elevation of the mechanism for advancing the chart drum;

FIGURE 7 is a cross-sectional detail of one of the four-way valves employed in the pneumatic circuit embodied in the present invention;

FIGURE 8 is a cross-sectional detail of the actuator and needle valve employed for operating the four-way valve shown in FIGURE 7;

FIGURE 9 is a detail of the portion of the mechanism used to drive the recording pen;

FIGURE 10 is a view taken along section line 10—10 of FIGURE 9 showing details of the reset mechanism;

FIGURE 11 is a cross-sectional detail of the magnetic drive portion of FIGURE 9;

FIGURE 13 is a circuit diagram of the pneumatic circuit employed in the present invention;

Figure 1:
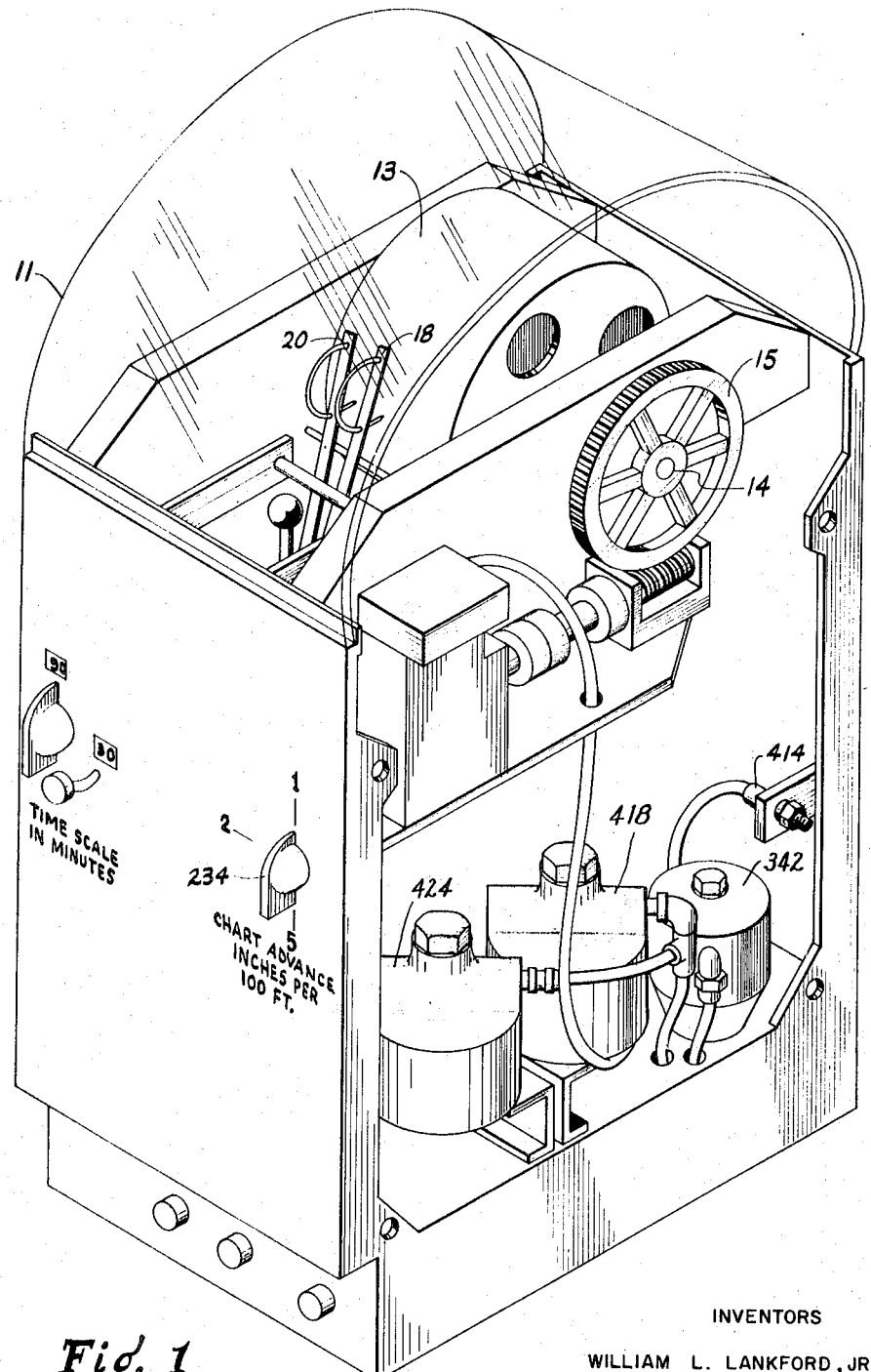
FIGURE 1 is a right-front perspective view of a recording apparatus constructed in accordance with the present invention.

Referring to the drawings in detail FIGURES 1 to 4 show a recorder having a main housing 10 enclosed by a semi-circular plastic lid or cover 11 which is connected to the housing along its rear edge 12 by means of suitable hinges (not shown) or the like. A drum 13 is suitably mounted for rotation within the recorder 10. The exact manner in which the drum is constructed and journaled for rotation in the recorder is not shown in detail herein; however for the purpose of this application it will be considered that the construction and mounting thereof is substantially the same as that shown in Patent No. 3,124,410. The drum 13 has a central shaft 14 upon which is mounted a worm gear 15. The worm gear is driven by a worm 16 in a manner later to be described in greater detail. At this point, it can be stated that rotation of the worm 16 will cause a small rotation of the drum 13 through the worm gear 15 and the shaft 14. A recording pen 18 is mounted adjacent the shaft drum 13 for marking a record on a suitable chart supported on the chart drum. A downtime pen 20 is also mounted adjacent the chart drum 13 for marking, on a different portion of the chart, various occurrences of downtime.

The means for operating the pens 18 and 20 will be described hereinafter in greater detail.

Figure 12:
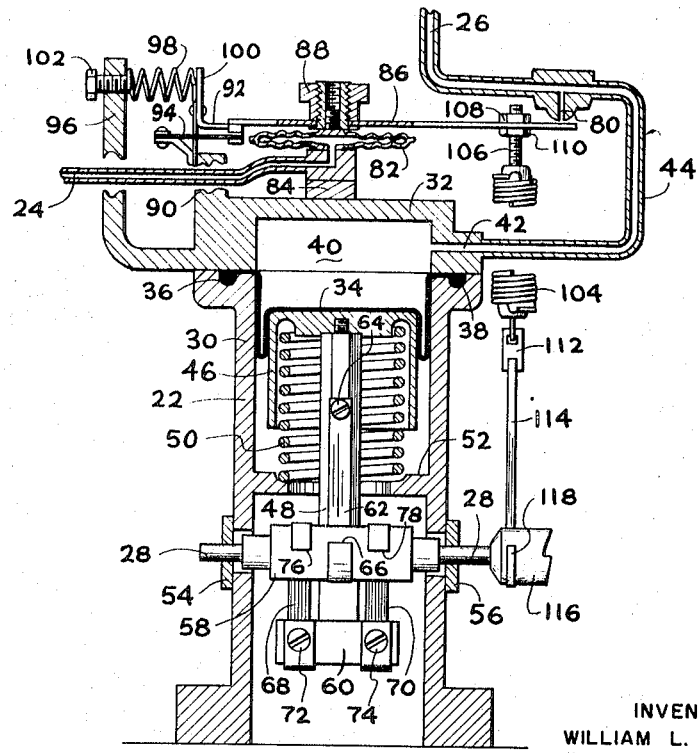
FIGURE 12 is a cross-sectional detail of the pneumatic motor employed to drive the recording pen.

Referring now to FIGURES 4, 5 and 12 the means for moving the pen 18 across the chart drum 13 is a servo motor, or pneumatic motor 22, which is capable of converting a variable pneumatic input into a correspondingly variable mechanical output; for example, a variable pneumatic input is supplied to the pneumatic motor 22 through the conduit 24 in a manner later to be described. A power source, such as a supply of air at 20 p.s.i. is supplied to the pneumatic motor 22 through the conduit 26. The output shaft 28 provides a variable turning action for moving the pen 18 to a position on the chart drum corresponding to the pressure in the conduit 24 as will hereinafter appear. For the purpose of simplifying the description of the pneumatic motor 22, the same is shown in an inverted position in FIGURE 12 with respect to the true position shown in FIGURE 4.

Referring now particularly to FIGURE 12, the pneumatic motor 22 includes a lower cylindrical base member 30 and an upper hollow cap 32 which is adapted to seat against the upper end of the cylindrical member 30. A flexible cup-shaped diaphragm 34 having an enlarged outer lip 36 is secured between the mating surfaces of the members 30 and 32 by virtue of the fact that the lip 36 is received in a recess 38 in the upper end of the cylindrical member 30. The members 30 and 32 are secured together by means of suitable nuts and bolts, etc. (not shown) such that an air-tight space 40 is provided between the inside of the cap 32 and the diaphragm 34. Communication to the space 40 is provided through the port 42 which connects externally with a conduit 44.

The lower or outer surface of the diaphragm 34 is secured to the upper surface of an inverted rigid cup 46 which is slidably mounted in the internal bore of the cylindrical member 30. A cylindrical rod 48 is threadedly secured at its upper end to the upper base portion of the cup 46. A spring 50 is mounted within the cylindrical member 30 surrounding the rod 48 such that the upper end of the spring 50 bears against the inner and upper end of the cup 46; the lower end of the spring 50 bears against an intermediate partition 52 provided within the cylindrical member 30.

The shaft 28 is mounted for rotation on suitable journals or bearings 54 and 56 in the cylindrical member 30. An enlarged sleeve 58 is keyed to the shaft 28. A cross member 60 is secured to the lower end of the rod 48. A first flexible metallic strap 62 is secured at its upper end to the rod 48 by means of screw 64. The other end of the strap 62 is wound around the collar 58 and secured at its extreme end 66 to the collar 58 by welding or any other suitable means. Two additional flexible metallic straps 68 and 70 are secured at their lower ends to the cross bar 60 by means of screws 72 and 74; the upper ends of the straps 68 and 70 are wound around the collar 58 in an opposite direction from the strap 62 and are secured at their outer extreme ends 76 and 78 by means of soldering or other suitable means. If the rod 48 were now lowered from the position shown in FIGURE 12 a resulting pull on the straps 68 and 70 would cause the sleeve 58 and the shaft 28 to rotate in a given rotary direction; conversely, if the rod 48 were moved upwardly a resulting pull on the strap 62 would cause the sleeve 58 and shaft 28 to rotate in a reverse rotary direction.

The conduit 26 connects with the conduit 44 and with a nozzle 80. The conduit 24 connected with a bellows 82 whose lower end is rigidly connected to the cap 32 by means of the support 84. The upper end of the bellows 82 is connected to a flapper 86 by means of the threaded connection 88. The left hand end of the flapper 86 is pivotally connected to a support member 90 by means of flexible straps 92 and 94. The support 90 is connected to, or forms an integral part of, the cap 32. The cap 32 is also provided with a vertical extension 96. A spring 98 is mounted between the vertical extension 96 and the left hand portion 100 of the flapper 86. Left hand portion 100 is disposed at right angles with respect to the main body of the flapper 86. The right hand end of the spring 98 bears against the member 100 whereas the left hand end of the spring 98 bears against an adjustable screw 102 which is threadedly received in a suitable hole in extension 96. Thus, the compression of the spring 98 can be adjusted by turning the screw 102.

The right hand end of the flapper 86 is disposed over the end of the nozzle 80 and will be moved towards or away from the nozzle 80 depending upon the pressure within the bellows 82. Another spring 104 is connected at its upper end to the right hand end of the flapper 86 by means of the threaded rod 106 and nuts 108 and 110. The lower end of the spring 104 is connected to a small coupling member 112 which, in turn, is connected to the upper end of an elongated flexible metallic strap 114. The lower end of the strap 114 is wound around a sleeve 116 which is keyed to the shaft 28. The lower extreme tip 118 of the strap 114 is connected to the sleeve 116 by soldering or other suitable means.

If the flapper 86 were to completely cover over the nozzle 80, the pressure within the chamber 40 would rise to the value of 20 p.s.i. or the input pressure in the conduit 26 and the rod 48 would be at its lowest position; stated differently if the nozzle 80 were completely covered by the flapper 86 the shaft 28 would have rotated the maximum amount possible. On the other hand if the flapper 86 were at its maximum distance away from the nozzle 80 the pressure in the chamber 40 would be at its minimum by virtue of the bleed of pressure through the nozzle 80 and thus the shaft 28 would have rotated its minimum amount.

Starting from a condition of zero pressure within the bellows 82, the flapper 86 will be at a maximum distance from the nozzle 80; if the pressure within the line 24 builds up, the pressure within the bellows 82 builds up accordingly and the right hand end of the flapper 86 approaches the nozzle 80 thereby tending to raise the pressure in the chamber 40. As the pressure within the chamber 40 goes up the rod 48 is urged downwardly tending to rotate the shaft 28 in a counterclockwise direction (looking from the left in FIGURE 12). As the shaft 28 rotates in the aforementioned direction the strap 114 is pulled downwardly increasing the tension in the spring 104 thereby tending to pull the flapper 86 away from the nozzle thereby creating a mechanical feed back condition. The purpose of the various springs and adjustments is to provide linearity between the mechanical output and the pneumatic input. It should be obvious that the shaft 28 will be rotated to a greater extent from its zero reference position depending upon the amount of pressure supplied to the bellows 82.

Returning now to FIGURES 4 and 5 a pulley wheel 120 is keyed to the outer end of the shaft 28. The base of the pneumatic motor 22 is connected at its upper end (now inverted with respect to FIGURE 12) to a bracket 122 by means of suitable bolts 124. A series of pulleys 126, 128, 130 and 132 are suitably mounted on the bracket 122. A cable 134 is wound around the pulleys 120, 126, 128, 130 and 132 and is driven by the pulley 120. A portion of the cable 134 extending between pulleys 128 and 130 is secured to a bracket 136 mounted on pen arm 138. Pen arm 138 supports the pen 18 at its upper outer end and is pivotally mounted at its lower end 140 within the recorder. Thus as the pulley 120 rotates in one direction or the other the pen arm 138 and hence the pen 18, will be moved in one direction or the other across the chart drum 13.

The pneumatic transmitter which provides the output pneumatic signal which is ultimately supplied to the conduit 24 is shown diagrammatically in FIGURE 13 by the reference character 142. The details of this pneumatic transmitter 142 are considered conventional and hence are not shown. Suffice to say that the transmitter 142 is capable of receiving a variable mechanical input and converting the same into a correspondingly variable hydraulic output. A typical transmitter which would be suitable for the purposes of this application is disclosed in Patent No. 3,142,312. The mechanical drive to the transmitter 142 is provided by a constant speed device such as a clock 144 shown in FIGURE 9. The clock 144 is considered conventional, and hence, the internal details thereof are not shown. An internal spring can be wound by means of a key through an external connection, (all of which are not shown). The clock 144 is provided with an output shaft 146 which is driven at a constant rotary speed by means of the clock 144 itself. A left hand coupling member 148 is keyed to the outer end of the shaft 146. A right hand coupling member 150 is disposed in meshing relation with the other coupling member 148 and is freely rotatably received within a cylindrical magnet housing 152. The magnet housing, as best shown in FIGURE 11, is keyed to the shaft 154 by means of set screw 156; a magnet 158 is keyed to the housing 152 by means of a plurality of set screws 160. A thin brass washer 162 and a plastic washer 164 are disposed between the adjacent surfaces of the coupling 150 and the magnet 158 so as to permit relative rotary movement therebetween when desired. In the absence of any restraining force, the clock 144 will cause rotation of the shaft 154 through the magnet coupling described above.

A pulley wheel 166 is keyed to the shaft 154. A chain 168 is wound around the pulley and secured thereto at its lower end. This chain 168 corresponds with element 82 in Patent No. 3,142,312 and connects in its upper end with a spring such as spring 84 in the aforementioned patent. The amount of rotation provided by the shaft 154 will determine the amount of extension of the last mentioned spring and will also determine the output pressure in the conduit 170 leading from the transmitter 142.

As stated heretofore the present invention has been particularly designed to record the time required for the drilling of a given increment of drilling distance. The pneumatic motor 22 ultimately determines the position of the pen 18 on the chart; the pneumatic transmitter 142 determines the signal to be applied to the transmitter 22 for moving the pen 18. Finally, it is the clock 144 which determines the output pressure to be provided by the transmitter 142. However, in the event that the drilling operation should be suspended midway during the drilling of a given increment, it would be desired to lock the pen or, ultimately, the transmitter 142 in a fixed position until the drilling operation resumes. Accordingly a breaking device is designed to apply a breaking force against the outside of the magnet housing 152 to prevent further rotation of the shaft 154. A pneumatic cylinder 172 is mounted on a bracket 174 which also supports the clock 144. The pneumatic cylinder has a slidable piston (not shown) mounted therein and having an outwardly extending piston rod 176; an arcuate brake shoe 178 is mounted at the outer end of the piston rod 176 adjacent the magnet housing 152. When pressure is introduced into the cylinder 172 through the conduit 180 the brake shoe 178 will be urged against the magnet housing 152 to prevent further rotation of the shaft 154. The clock motor 144 will continue to drive the shaft 146 but relative slippage will occur between the coupling 150 and the magnet 158, the frictional force being reduced by the washers 162 and 164. The pressure in the line 180 can be created, as will hereinafter appear, by a "downtime" signal.

Since the pressure output from the transmitter 142 is correlated with the individual increments of drilling, it is necessary that the transmitter 142 be returned to its initial position at the end of each given increment of drilling so that it can commerce to produce a new signal for the next increment of drilling. For this purpose a pinion or spur gear 182 is keyed to the shaft 154. Another shaft 184 is mounted for rotation parallel to the shaft 154; a gear sector 186 is keyed to the shaft 184 and engages the pinion 182 in meshing relation. A housing 188 surrounds the pinion 182 and the gear sector 186 as shown in FIGURE 10. A cylinder 190 is mounted in the housing 188. A piston (not shown) is mounted within the cylinder 190 and has an outwardly extending piston rod 192 with an enlarged head 194. A conduit 196 connects with the cylinder 190. When pressure is applied to the cylinder 190 through the conduit 196 the piston rod 192 will be extended such that the head 194 will contact the adjacent edge 198 of the gear sector 186. This action of the piston against the gear sector 186 will drive the gear sector in a clockwise direction until the other edge 200 comes to rest against the bottom surface 202 of the recess 204 which surrounds the gear sector. At the same time, rotation of the gear sector 186 in a clockwise direction will cause counterclockwise rotation of the pinion 182 so as to drive the shaft 154 in a reverse direction with respect to that provided by the clock 144. This reverse movement is taken up within the magnet housing 152 by virute of the relative slippage between the magnet 158 and the coupling 150.

Figure 2:
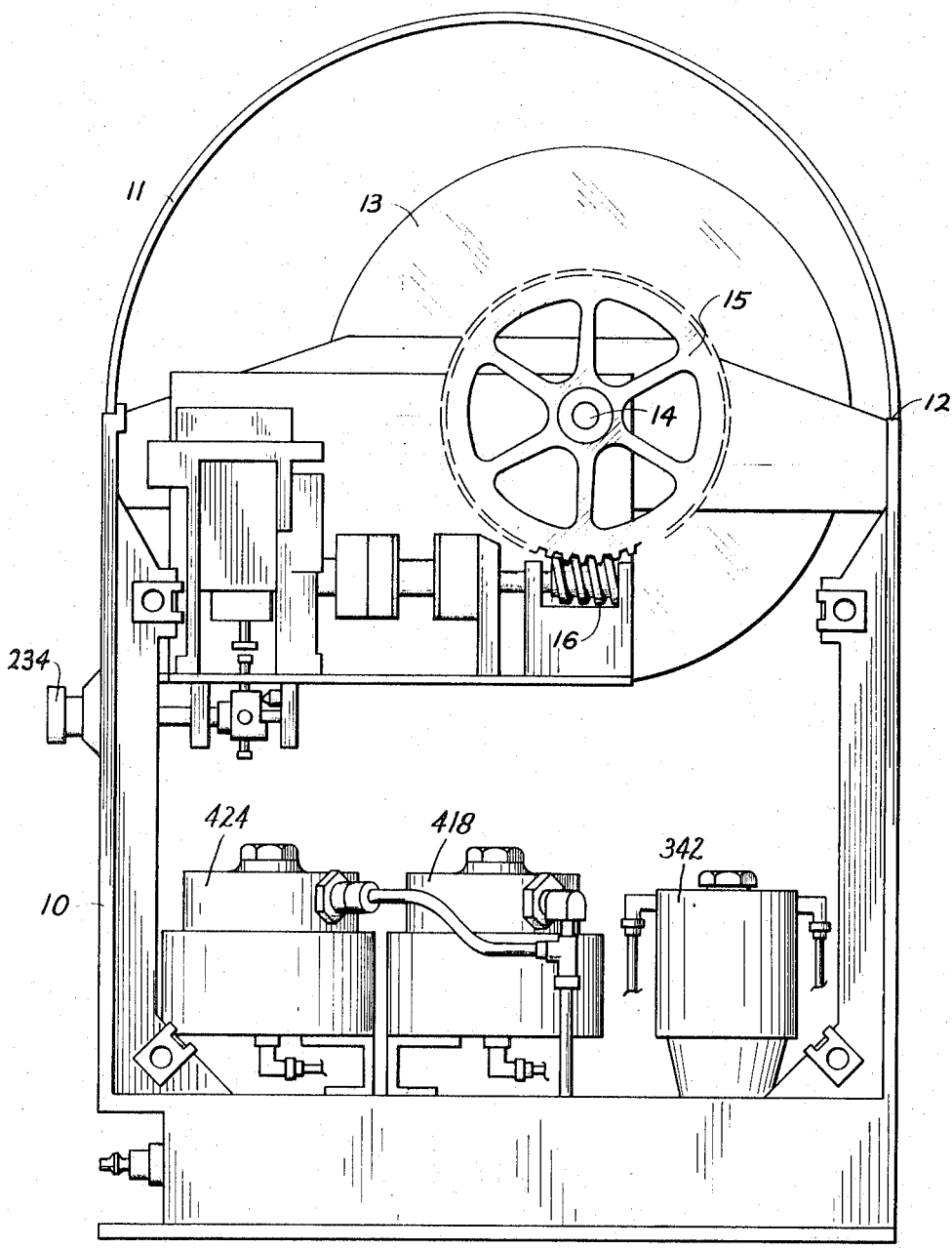
FIGURE 2 is a right-side view of the recording apparatus shown in FIGURE 1.
Figure 3:
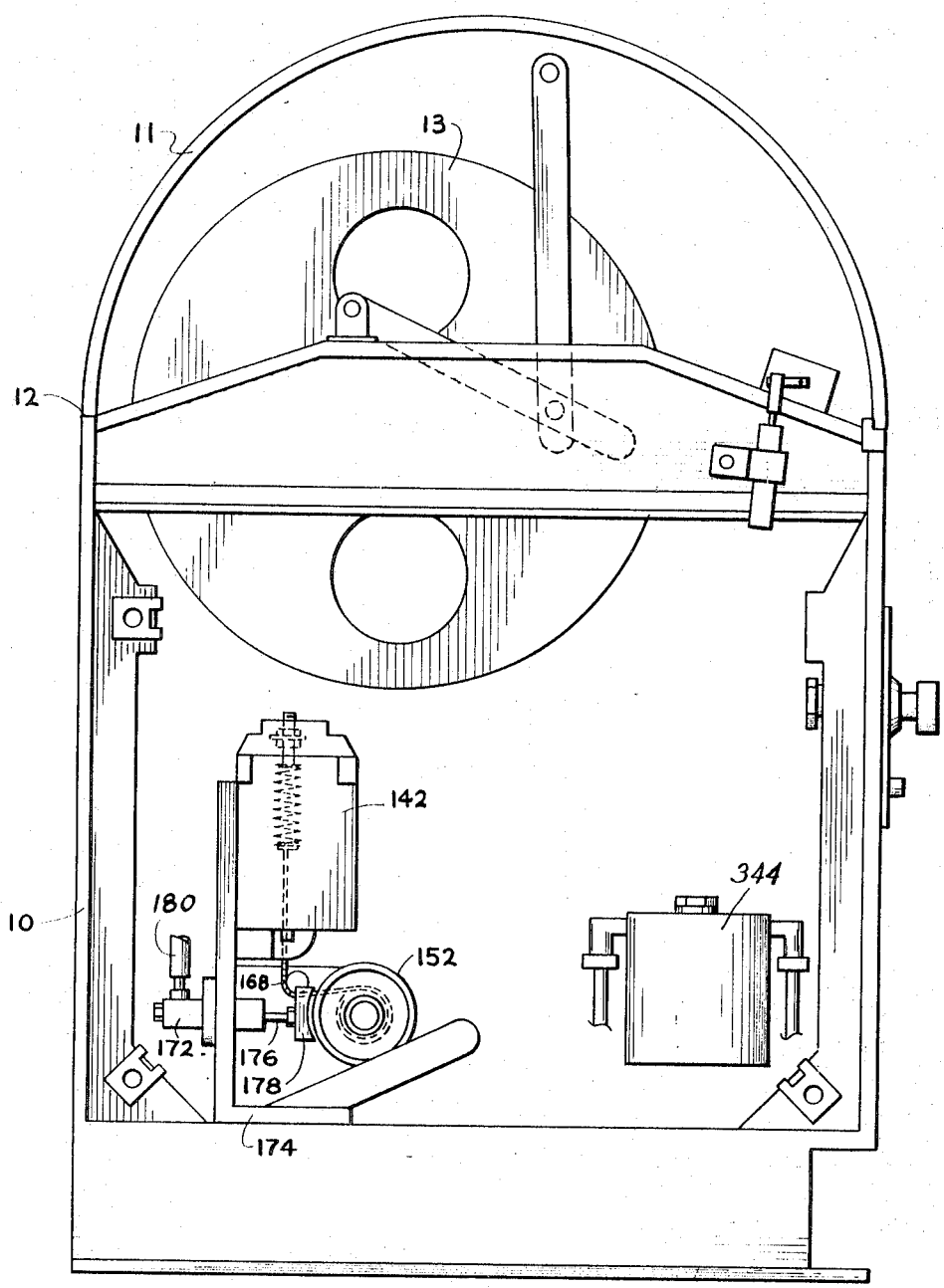
FIGURE 3 is a left-side view of the recording apparatus shown in FIGURE 1.

The means for advancing the chart drum 13 is best shown in FIGURES 2 and 6. As stated heretofore the worm 16 drives the worm wheel 15, the shaft 14, and hence the chart drum 13. The worm 16 is keyed to a shaft 206 which is suitably journaled for rotation within the recorder. A pneumatic motor 208 is mounted in driving relation with respect to the shaft 206 as will be explained hereinafter. This pneumatic motor is similar to the pneumatic motor 22 shown in FIGURE 12 and described herein. However the pneumatic motor 208 is a simplified form of pneumatic motor 22 in that the flapper and nozzle arrangement has been eliminated such that the chamber 40 contains a single inlet conduit. All of the structure associated with the nozzle and flapper arrangement such as the spring 104 and the strap 114 have been eliminated to produce the pneumatic motor 208. Thus the pneumatic motor 208 acts essentially as a pneumatic cylinder-piston combination. However the rod 210 in the motor 208 which corresponds to rod 48 in the motor 22 is coupled to the output shaft 212 by means of flexible straps 214, 216, etc. in the same manner that rod 48 is coupled to the shaft 28 by means of its flexible straps and associated structure. The shaft 212 connects through a one-way clutch 218 and its associated clutch housing 220 to a coupling 222. The coupling 222 connects through another one-way clutch 224 which is mounted on the upright 226. The clutch 224 acts as a brake to prevent reverse rotation of the shaft 206. When an input pulse is fed into the conduit 228 which connects with the internal chamber in the motor 208 the rod 210 is urged downwardly immediately.

Whereas a means for providing an operative connection between the motor 208 and the worm 16 included, inter alia, the clutches 218 and 224, it is obvious that other and similar driving arrangements could be provided; for example, suitable pawl and ratchet combinations could be employed in lieu of the clutches. It is merely necessary that a downward movement of the rod 210 result in a rotation of the worm 16 in a given rotary direction; just so long as means are provided to prevent any rotation of the worm 16 upon the return or upward movement of the rod 210, any means capable of accomplishing this result would satisfy the requirements of the drive system desired. In practice it has been found that one-way clutches of the type manufactured by the Formsprag Company, as illustrated in their brochure FS–859, can be used advantageously as the clutches 218, 220 and 224 disclosed herein.

The lower end of the rod 210 is provided with an enlarged head 230 such that the rod and head together can be considered as a sort of plunger. In order to limit the downward movement of the resulting plunger, FIGURE 6 provides a transverse shaft 232 having an external knob 234 keyed thereto. The knob 234 has a pointer associated therewith adapted to move to one of three different positions depending upon the position of the knob 234 to indicate different relative rates of chart advance. The shaft 232 is journaled for rotation between a pair of standards 236 and 238. A collar 240 is keyed to the shaft 232 between the standards 236 and 238. Three radially projecting lugs 242, 244, and 246 are threadedly received in the collar 240. The center line of each lug radially intersects the central axis of the shaft 232. Each lug terminates at a different distance radially outward from the center line of the shaft 232. For example, the outer end of the lug 242 extends outwardly from the center of the shaft 232 a greater distance than the outer end of the lug 246. The outer end of the lug 244 is at an intermediate radial distance between the outer ends of the lugs 242 and 246. As shown in FIGURE 6 the lug 242 is in a position to intercept the downward movement of the head 230. By rotating the knob 234 it is possible to position lug 244 or lug 246 in the same position as now occupied by the lug 242. Thus, when the lug 246 is in the position presently occupied by the lug 242 the head 230 can move downwardly to its lowermost or outermost position. Therefore, when the lug 242 is in the position shown in FIGURE 6 downward movement of the head 230 resulting from a pulse introduced through the conduit 228 will involve a minimum rotation of the worm 16; similarly when the lug 246 is in the position now occupied by the lug 242, a downward movement of the head 230 will result in a maximum rotation of the worm 16. Finally, when the lug 244 is in the position now occupied by the lug 242 downward movement of the head 230 will result in an intermediate amount of rotation of the worm 16. A spring urged detent 248 is mounted in the standard 238 so as to be urged towards the left. The left hand end of the detent 248 is rounded or pointed as shown in FIGURE 6 and is adapted to engage suitable rounded or pointed depressions in the adjacent surface of the collar 240 so as to retain a given lug in alignment with the head 230 when the knob has been turned to a given position.

FIGURE 7 shows a cross sectional detail of one of the four-way valves employed in the circuit of FIGURE 13. This valve 250 is provided with a main body portion 252 having a central bore 254 therein. A slidable piston 256 is mounted within the bore 254. The body of the valve is provided with one inlet port 258 and two outlet ports 260 and 262 leading into the bore 254. The body is also provided with two atmospheric ports 264 and 266. The piston 256 is provided with a shoulder 270 adjacent its lower end and a spring 268 is located within the bore 254 between the lower end of the bore and the shoulder 270 so as to urge the piston 256 upwardly. A pair of spaced O-rings 272 and 274 are mounted within suitable annular recesses in the piston 256. The valve is also provided with an outwardly projecting stem 276 which connects with the piston 256 to permit operation thereof.

Let us assume that a source of pressure is now applied to the port 258. This pressure would be transferred to the output port 260 in the position of the valve shown in FIGURE 7, while the other output port 260 would be in communication with the atmosphere through the port 266. If the piston 256 is now moved downwardly by pushing down on the stem 276 such that the O-rings 272 and 274 were below the outlet ports 260 and 262 respectively, then the pressure would be transmitted from the inlet port 258 to the outlet port 262, whereas the outlet port 260 would be in communication with the atmosphere through the port 264. The valve 250 is also provided with an upper threaded portion 278 to permit attachment to an adapter as will hereinafter appear.

FIGURE 8 shows the adapter referred to above and a needle valve connected with the four-way valve of FIGURE 7. The adapter 280 is provided with a central cylindrical bore 282 and an enlarged threaded bore 284 in which is received the threaded portion 278 of the four-way valve 250. A piston 286 is mounted within the bore 282 for sliding movement therein and an O-ring 288 is mounted in a suitable annular recess in the piston 286. The lower end of the piston 286 is provided with a recess 290 for receiving the upper end of the stem 276 of the valve 250. A retaining ring 292 is mounted in a recess between the threaded portion 284 and the bore 282, and a washer 294 is mounted above the retaining ring. A spring 296 is mounted between the washer and the lower end of piston 286 so as to urge the piston upwardly within the cylindrical bore 282. An elongated central port 298 leads from the upper end of the bore 282 to the upper threaded end 300 of the adapter 280.

A needle valve 302 is shown having a lower threaded portion 304 adapted to engage the upper threaded end 300 of the adapter 280. The upper end of the needle valve 302 is also provided with a threaded portion 306 for receiving a threaded conduit for the supply of air under pressure. The needle valve 302 includes an adjustable needle 308 which is movable towards and away from a seat 310 and which can be locked in position by means of a lock nut 312. The needle valve 302 also includes a ball 314 which is spring urged towards a seat 316 by means of a spring 318. The needle valve 302 is a needle valve in one direction only; that is, when the pressure source is from above as in FIGURE 8, the pressure will assist the spring 318 in holding the ball 314 against its seat 316 such that the only path of fluid is around the needle 308 through the seat 310. However, if the pressure source were from below the effect of the pressure would be to move the ball 314 out of its seat against the action of the spring providing a greater path for flow in the upward direction than previously stated.

The purpose of the arrangement of valve in FIGURE 8 is to provide a slight time delay for the actuation of the valve 250. For example, as will hereinafter appear, if it is desirable to supply a source of pressure simultaneously to the port 258 and to the upper end of the needle valve 302, the fact that the pressure at the top of the needle valve must work its way around the needle down through the bore 298 into the actuator 280 results in a slight delayed downward movement of the piston 286 with a consequent delay in the downward movement of the piston 256. In the meantime the pressure coming into the inlet port 258 of the valve 250 has been transmitted adequately to the outlet port 260 and to any circuit connected therewith. Thereafter as the pressure within the adapter 280 builds up the piston 256 is moved to its lowermost position at which time the pressure from the outlet conduit 260 is vented to the atmosphere through the port 264 and the pressure from the inlet port 258 is transferred to the lower outlet port 262 and to any circuit connected therewith.

As indicated previously, two signals are required for the operation of the recorder of the present invention:

First of all it is necessary to have a downtime pulse or signal for deflecting the downtime pen and for holding the pneumatic transmitter in fixed position. The downtime signal can be provided in conjunction with an on-off switch or lever at the site of the drilling rig. It is customary, for example, to employ a mechanical type recorder at the drilling rig so that the operator can follow the progress of the drilling operation. It is also customary for the operator to disengage this mechanical recording device when the drilling operation ceases; in such a case the operator disconnects the mechanical recording apparatus by moving the on-off lever to the off position. Thus a valve could be operatively connected to the on-off lever such that the valve would be actuated when the lever was in the "off" position thereby providing a continuous downtime pulse or signal for the purposes of the present invention. Of course, any other convenient way of providing a downtime signal would be satisfactory for the purposes of the present invention.

As far as the drilling signal is concerned; i.e., the signal which provides information concerning the completion of each increment of drilling distance, this signal can also be provided in many different ways. For example, the signal might be provided by a valve which would be actuated in response to the movement of the main shaft in Patent No. 2,883,256 using a two-lobed cam. Preferably however it is desired to use the pneumatic footage transmitter disclosed in copending application Ser. No. 409,193 filed Nov. 5, 1964, assigned to the assignee of this application for providing this drilling signal. The lower portion of FIGURE 13 shows a system for providing the drilling signal which is consistent with the disclosure of the aforementioned patent application.

Referring now to FIGURE 13 the lower left hand portion thereof shows a dotted line rectangle which represents the footage transmitter. A two-lobed cam having lobes 320 and 322 is keyed for rotation on shaft 324. A valve 326 having an actuator 328 is mounted adjacent the cam 318 such that the actuator 328 is actuated by the lobes 320 and 322. A source of supply of air under pressure is designated by the reference character 330 and is connected to the valve 326 by means of a conduit 332. In actuality, the shaft 324 makes one revolution for each two feet of drilling. Accordingly, each lobe 320 or 322 represents a single foot of drilling. However, since each lobe extends for 90 degrees of the circumference of the cam 319, the valve 326 will be actuated for the first six inches of each foot being drilled. Therefore, the output pressure from the line 334 will be continuous for the first six inches of each foot being drilled. Furthermore, since the source of air under pressure 330 is a regulated 80 p.s.i. source the signal in the line 334 will be a constant 80 p.s.i. signal for its duration.

The recorder of the present invention also requires its own air supply thus the front of the recording apparatus will be provided with three input jacks or connectors 336, 338 and 340 labeled "downtime signal," "footage signal," and "air supply," respectively. The air supply passes through a first regulator 342 for supplying a regulated 80 p.s.i. to certain of the components in the system as will hereinafter appear. From the 80 p.s.i. regulator the air passes through another regulator 344 where the air is reduced to a regulated pressure of 20 p.s.i. which is used as an operating pressure for the various pneumatic motors, transmitter and relays shown in FIGURES 13 and 14.

The footage signal passes from the conduit 334 through the connector 338 into the recording apparatus and through a conduit 346 to the actuator portion of a normally close on-off valve 348. The inlet to the valve 348 connects with the 80 p.s.i. supply from the regulator 342 by means of a conduit 350. The outlet from the valve 348 connects first of all to the inlet port of a first four-way valve 352 by means of conduit 354 and, at the same time, to the actuator port of the four-way valve 352 by means of conduit 356.

At this juncture, it should be pointed out that the four-way valve designated as 352 is, in actuality, the combination shown in FIGURE 8; i.e., the four-way valve itself plus its actuator plus the one-way needle valve which provides a delay in the actuation of the four-way valve itself. Accordingly when considering the four-way valve 352 shown on FIGURE 13 the uppermost portion thereof shall be considered as corresponding with the needle valve 302. The center portion shall be considered as corresponding with the adapter 280 and the lower portion will correspond with the four-way valve 250, itself.

As stated heretofore the footage signal comes to the valve 348 via conduit 346 into the actuator portion of the valve. The signal in the line 346 will cause the normally closed valve 348 to open providing communication between the inlet 350 and the outlet of this valve connecting with the conduits 354 and 356.

Four-way valve 352 is shown as having an inlet connected with the conduit 354, an upper outlet connected with the conduit 358 and a lower outlet connected with the conduit 360.

When the footage signal is applied to the normally closed valve 348 through the conduit 346 an 80 p.s.i. signal is allowed to pass from the conduit 350 through the valve 348 and into the inlet conduit 354 for the four-way valve 352 while at the same time supplying 80 p.s.i. to the actuator portion of this valve through the conduit 356. However, since there will be a delay in the downward movement of the piston portion of the valve 352, as previously explained in conjunction with the description of FIGURES 7 and 8, this 80 p.s.i. signal is applied first to the conduit 358. Conduit 358 connects to the actuator portions of two normally closed valves; that is, conduit 358 connects with the actuator portion of normally closed valve 362 by means of the conduit 364; conduit 358 also connects with the actuator portion of normally closed valve 366 by means of the conduit 368. The inlet of normally closed valve 362 is connected to a 20 p.s.i. source by means of conduit 370. The outlet of valve 362 is connected to the inlet of the pneumatic motor 208 by means of the conduit 228. Thus when the 80 p.s.i signal appears in the line 358 by virtue of the actuation of the valve 352 from the footage signal the normally closed valve 362 is opened and the 20 p.s.i. passes through this valve to actuate the motor 208 and advance the chart drum 13 in a manner previously described.

In order to describe the operation of the valve 366, let us first assume that the conduit 372 which is connected to the inlet of the valve 366 is in direct communication with the outlet conduit 170 from the pneumatic transmitter 142. In other words, consider that a line has been drawn connecting points A and B. The outlet of the normally closed valve 366 is connected to the inlet of the pneumatic motor 22 by means of the conduit 24. The supply conduit 26 for the pneumatic motor 22 is connected to the 20 p.s.i. source as shown on the diagram. Therefore when an 80 p.s.i. signal is present in the line 358 the normally closed valve 366 is opened by virtue of its connection through the conduit 368 and the output of the pneumatic transmitter 142 passes through the conduit 170, from A to B, through the conduit 372, through the conduit 24 to the air motor 22. As described previously the motor 22 will then move the pen 18 to a position on the chart corresponding with the pressure in the line 24.

Although the two valves 362 and 366 are open simultaneously, the response rate of the motor 208 is inherently so much faster than the air motor 22 that the chart is advanced or stepped before the pen has made any substantial movement on the chart.

After a predetermined period of time as determined by the setting of the needle valve portion of the four-way valve 352, the pressure above the piston in the valve 352 will build up to a degree sufficient to move the piston downwardly at which time the pressure in the conduit 358 will be vented to the atmosphere through the atmospheric port in the valve 352. At the same time the 80 p.s.i. signal will now pass into the conduit 360.

The conduit 360 connects with the inlet port of a second four-way valve 374 which is substantially identical to the valve 352 previously described; that is, the four-way valve 374 is provided with an upper needle valve portion, an intermediate adapter and a lower four-way valve portion just as shown and described in relation to FIGURES 7 and 8. The conduit 360 is also connected to the needle valve portion of the four-way valve 374 by means of the conduit 376. Valve 374 has two outlets, the upper outlet being connected to the conduit 378 and the lower outlet being connected to the conduit 380. The valve 374 has two atmospheric ports similar to that shown in FIGURE 7. The operation of the valve 374 is substantially the same as that previously described in connection with valve 352.

Accordingly when an 80 p.s.i. signal passes from the lower outlet of the valve 352 by means of conduit 360 to the inlet of the valve 374, an 80 p.s.i. signal is first present in the conduit 378. The conduit 378 is connected to a pneumatic counter 382 which is adapted to register an additional foot of drilling, for example, when the 80 p.s.i. signal is presented thereto from the conduit 378.

A short time after the 80 p.s.i. signal is presented to the valve 374 the piston there is moved to its downward position such that the 80 p.s.i. signal is now transmitted to the conduit 380, the pressure in the line 378 being then vented to the atmosphere. The conduit 380 connects with a third four-way valve 384 by means of conduits 386 and 388.

The four-way valve 384 is substantially identical to four-way valves 352 and 374 previously described; that is, it has an upper needle valve portion, an intermediate adapter portion and a lower four-way valve portion. The conduit 388 connects to the needle valve portion of the valve 384 to provide actuation thereof. The conduit 386 connects to the inlet port of the four-way valve portion. Although the four-way valve 384 is provided with upper and lower outlets, only the upper outlet is utilized; this upper outlet of the valve 384 is connected by means of conduit 196 to the reset cylinder 190.

Thus, after the counter 382 has been actuated, and after the 80 p.s.i. signal has been transferred to the conduit 380, the 80 p.s.i. signal will pass from the conduit 386, through the four-way valve 384, through the conduit 196 and to the reset cylinder 190 so as to reset the pneumatic transmitter 142 as previously described in connection with FIGURES 9, 10 and 11. After a short period of time the piston within the four-way valve 384 will be moved downwardly, the pressure in the conduit 196 will be vented to the atmosphere through the atmospheric port within the valve 384, and the reset cylinder 190 will be de-energized.

If and when a downtime signal should occur, the same will be transmitted from the connector 336 through a conduit 390 to conduit 180 and to a conduit 392. The conduit 180 is connected to the brake cylinder 172 for actuating the brake in the manner previously described. The conduit 392 connects with a downtime cylinder 394 which has a slidable piston (not shown) mounted therein. The piston within the cylinder 394 has an outwardly projecting piston rod 396 which is adapted to engage a pen arm 398. The pen arm 398 is pivotally mounted at its lower end 400 and supports at its upper end the downtime pen 20. Thus when the downtime pulse comes into the recorder through the conduit 390, the downtime cylinder is actuated to extend the piston rod 396 so as to pivot or deflect the pen arm 398 and the pen 20 towards the right with respect to the relative positions shown in FIGURE 13.

Figure 14:
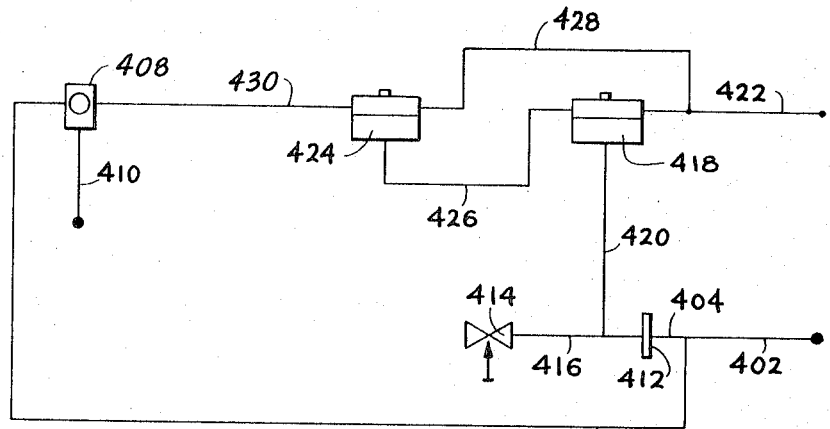
FIGURE 14 is a circuit diagram of the pneumatic multiplier circuit which is used in conjunction with the pneumatic circuit of FIGURE 13.

The following description of FIGURE 14 should be considered in light of the preceding description of FIGURE 13. It was assumed in the description of FIGURE 13 that a direct connection existed between point A and B. Indeed, FIGURE 14 does provide a direct connection, in effect. FIGURE 14 also provides a means for multiplying the output from the transmitter 142 into the conduit 372 as will hereinafter appear. Point A in FIGURE 14 connects with a conduit 402 which in turn connects with two other conduits 404 and 406. Conduit 406 connects with one of the two inlets of a three-way valve 408. The single outlet of the three-way valve 408 connects with point B my means of conduit 410.

Conduit 404 connects with an orifice 412 which leads into the multiplying portion of the circuit of FIGURE 14. The outlet of the orifice 412 connects with a needle valve 414 by means of conduit 416 and, at the same time, with the inlet of a pneumatic relay 418 by means of the conduit 420. Point C on FIGURE 14 connects by means of conduit 422 with the power inlet to the pneumatic relay 418. It should be mentioned that point C on FIGURE 14 corresponds with point C on FIGURE 13 which is connected to the output of the 20 p.s.i. regulator 344. Thus the pneumatic relay 418 is provided with a regulated 20 p.s.i. pressure supply through the conduit 422.

The output of the pneumatic relay 418 is connected to the inlet of a second pneumatic relay 424 by means of conduit 426. The power supply for the pneumatic relay 424 is provided by means of conduit 428 which connects with the conduit 422 and with the inlet power port of the pneumatic relay 424. The outlet of the pneumatic relay 424 is connected to the other inlet of the three-way valve 408 by means of a conduit 430.

The operation of the circuit of FIGURE 14 will now be briefly described as follows. The three-way valve 408 has two operative positions; the first position provides communication through the valve between conduits 406 and 410; this corresponds to the condition where the conduit 170 and the conduit 372 are connected directly together. The other position of the valve 408 provides communication through the valve between conduits 430 and 410; this corresponds to the condition where the output from the conduit 170 is multiplied by three before it passes into the conduit 372. Relays 418 and 424 are two-to-one relays; that is, the output pressure from each relay (minus the zero reference pressure) will be double the input pressure (minus the zero reference pressure) to the relay. At this point it should be noted that multiplying relays are known per se and these relays form no part of the present invention except in so far as they are employed in the circuit disclosed herein. A multiplying relay is shown broadly in FIGURE 8 of co-pending application Ser. No. 802,968 filed on Mar. 30, 1959; however the last mentioned relay is not considered precise enough for the purposes of the present invention nor is it provided with a zero 3 p.s.i. bias for operating the relay as will hereinafter appear.

As indicated above, the position of the valve 408 wherein communication is provided between conduits 410 and 430, corresponds to a condition wherein the output from the conduit 170 is multiplied by three; however it will be noted that we have two 2-to-1 relays connected in series such that one might expect the pressure to be multiplied by four. On the other hand, the first relay 418 is actually converted to a 1.5-to-1 relay by virtue of the needle valve 414 which is connected at one end to the conduit 416 and at its other end to the atmosphere. Thus by bleeding some of the input pressure to the relay 418 by means of adjustable needle valve 414 it is possible to create the condition described above. With the relays 418 and 424 connected in series, and with the action of the relay 418 modified by the needle valve 414, the multiplication factor becomes three instead of four.

The various pneumatic components shown and described herein are designed to operate on a 3 to 15 p.s.i. range of pressures. The 3 p.s.i. value represents the zero reference position and the 15 p.s.i. represents the maximum position. More specifically, as far as the present disclosure is concerned, when the pneumatic transmitter 142 has been returned to its zero reference position by the reset mechanism shown in FIGURE 10 and before a clock 144 begins to impart rotary motion to this transmitter 144, nevertheless the output pressure from the transmitter will be 3 p.s.i. The interrelationships between the shaft 154, the pulley wheel 166, the chain 168 and the transmitter 142 itself, are such that a 180 degree rotation of the shaft 154 will produce a maximum 15 p.s.i. output from the transmitter 142. Similarly, a 3 p.s.i. input pressure to the air motor 22 will merely cause the pen 18 to rest against its left-hand or zero reference position; a 15 p.s.i. input pressure to the air motor 22 will cause the pen 18 to be moved to the extreme right to the full scale value on the chart.

In order to satisfy the many and varied drilling requirements, it is contemplated that two different species of clocks, when used in conjunction with the circuit of FIGURE 14, will satisfy these requirements. One clock will be designated as a "one-hour" clock because it provides one complete revolution of its output shaft 146 each hour. Such a clock would provide a 180 degree rotation of the shaft 154, or a full scale deflection of the pen 18 corresponding to a 30-minute interval, when the valve 408 is in the position where conduits 406 and 410 are in communication with each other. The other type of clock is referred to as a "three-hour" clock because the output shaft 146 would make but one revolution every three hours. This three-hour clock would provide a 180 degree rotation of the shaft 154 to provide a full scale deflection of the pen 18 corresponding to a 90-minute interval when the valve 408 is in the position where the conduits 406 and 410 are in communication with each other.

If the same two clocks described above were separately employed in the recorder disclosed herein, it should now be considered what would happen if the valve 408 in FIGURE 14 were turned to the position where conduits 410 and 430 were in communication with each other. As stated above, a 180 degree rotation of the shaft 154 will provide a full scale deflection without the multiplication factor. Since the circuit in FIGURE 14 is now using a multiplication factor of three, this means, ultimately, that each of the clocks described above would turn only one-third the amount indicated previously to produce a full scale deflection on the chart. Thus, using the "one-hour" clock and the multiplication portion of the circuit of FIGURE 14, a full scale deflection of the pen would correspond to ten minutes. Similarly, using the "three-hour" clock and the multiplication portion of the circuit of FIGURE 14, a full scale deflection of the pen 18 would correspond to thirty minutes.

Figure 15:
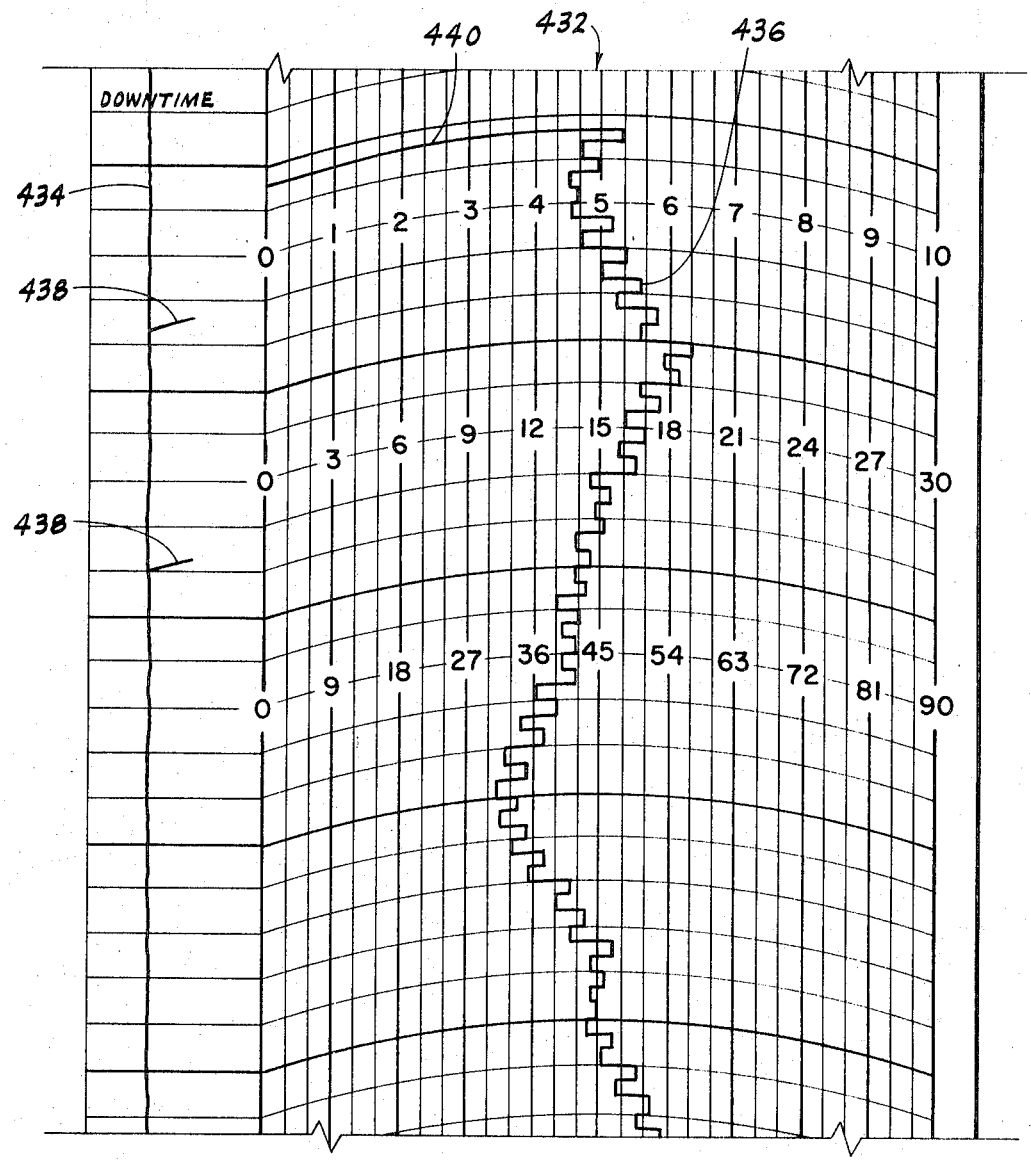
FIGURE 15 is a view of a portion of a typical chart which might be produced by the recording apparatus of the present invention.

FIGURE 15 shows a portion of a typical chart 432 which might be produced by a recorder of the type disclosed herein. The left hand or "downtime" trace 434 would be produced by the downtime pen 20. The other trace 436 is produced by the footage pen 18. The downtime trace shows a plurality of deflections 438 to the left as would be normally produced by a deflection of the pen 20 through actuation of the downtime cylinder 394. In the absence of any downtime signals the trace 434 would otherwise be a substantially vertical line on the chart 432.

The remainder of the chart to the right of the downtime portion has a normal vertical ordinate with a plurality of parallel vertical lines representing the value in minutes from the ordinate; the abscissa, however, is not exactly horizontal as might be expected but is somewhat curved so as to correspond with a path parallel to the movements of the pen 18 across the chart 432. It is noted that the chart is provided with three different scales, 0 to 10, 0 to 30, and 0 to 90. These three scales correspond to the employment of the two different clocks referred to above with and without the multiplier portion of the circuit of FIGURE 14. The uppermost horizontally oriented, but otherwise curved line 440 represents the movement of the pen 18 from its zero reference position to a value corresponding to the time required to drill a foot, for example. It should be noted however that the trace 436 does not return to the zero reference line at the end of each foot but merely moves towards the right or towards the left to the value corresponding to the time required for the drilling of the next foot. The resulting trace 436, thus, can be compared with the electrical log type of recorder. If the vertical space between the adjacent horizontal lines on the trace 436 is considered to be too close or too far apart, adjustment thereof can be made by turning the knob 234 to change the rate of chart advance.

Whereas the present invention has been described in particular relation to its use as a drilling rate recorder, it should be obvious that other uses are contemplated within the spirit and scope of this invention. For example, the ordinate on the chart disclosed herein represents distance, or the number of feet drilled; the abscissa represents time, or more particularly, the time required to drill each foot.

It is possible that the ordinate and abscissa could be interchanged or that they could be used to represent different variables. Thus, if it were desired to change the ordinate to time, the signal supplied to the pneumatic motor 208 would be on a time basis rather than on a footage basis; in such a case the cam 319 could be driven by a constant speed device, such as a clock, or this cam could be replaced by another cam which would be so driven.

Again, if it were desired to have the abscissa represent the number of occurrences in a given time period, the clock 144 could be replaced by a pawl and ratchet system to turn the shaft 154 stepwise for each occurence within a given time interval; for example, a piston cylinder arrangement operating this pawl and ratchet combination could be actuated by a pulse at the end of each occurrence. The time signal referred to above would be used to operate the reset cylinder 190.

The multiplying relays are preferably of the type manufactured by Moore Products Company, model 540–2; however any other multiplying relays can be used providing that they are sensitive enough and accurate enough for the purposes of the present invention. It should be borne in mind, since the control range is 3 to 15 p.s.i., such multiplying relays must have mechanical or pneumatic means for providing a 3 p.s.i. bias representing the so-called "zero" output at a 3 p.s.i. or "zero" input. The multiplying circuit shown in Patent No. 3,181,165 might also be employed, if desired.

Whereas the action of the chart advance as related to the movement of the pen has been described and illustrated in connection with a step-like trace, this effect can be altered, if desired. For example, if the response rate of the motor 208 is reduced by adding resistance in the line 228 or at the input of the motor itself, it is possible to produce sharp or pointed traces on the chart; functionally, this would mean that the pen and the chart were moving at the same time. Also it has been indicated that the chart is advanced or stepped before the pen has made its movement on the chart. This condition can be reversed if desired. For example, if line 364 were connected to the output 378 of the valve 374 the chart advance could be made subsequent to the movement of the pen on the chart. Thus the exact manner and sequence of movements might turn out to be a matter of customer preference.

Whereas the multiplication circuit disclosed herein employs a multiplication factor of 3, it should be obvious that other valves and arrangements of valves could be used to product other multiplication factors. Likewise, the clocks referred to herein have been described as one-hour and three-hour clocks. Naturally, any type of constant speed device, whether it is a thirty-minute clock or a five-hour clock (or any other type of constant speed device), could be employed in lieu of the clocks described herein.

The maximum input to the transmitter 142 has been described in terms of a 180 degree movement of the shaft 154; obviously, different interrelationships could be established between the various parts disclosed herein such that a different amount of rotation of the shaft 154 could provide this maximum input to the transmitter 142.

This invention is not limited to the particular trace shown on the chart, nor is it limited to the specific ranges of values disclosed thereon. Consistent with the employment of different and various types of clocks or other constant speed devices, the scales on the charts may vary. Furthermore, although the abscissa is shown as slightly curved, obviously, this could be made horizontal or slanted depending upon the manner in which the pen is mounted. That is, although the pen is shown herein as pivotally mounted it could, of course, be slidably mounted.

Other and further modifications, apart from those shown or suggested herein, may also be made within the purview of this invention.

What is claimed is:

1. A pneumatic recorder comprising a chart, chart advance means for moving said chart within said recorder, a stylus mounted in said recorder and movable over said chart for marking a record thereon, a pneumatic motor having a pneumatic input and a mechanical output operatively connected to said stylus for moving said stylus relative to said chart, a pneumatic transmitter having a mechanical input and a pneumatic output, means within said transmitter for converting a change in value in said mechanical input into a corresponding change in value in pneumatic pressure at its output, means responsive to a change in value of a measured variable for driving the mechanical input for said pneumatic transmitter so as to produce a pneumatic pressure at the output of said transmitter commensurate with the change in value of said measured variable, connecting means responsive to the completion of a measuring interval for connecting the output of said transmitter with the input of said pneumatic motor and for applying the output pneumatic pressure from said transmitter to said pneumatic motor so as to move said stylus to a position on said chart representing the relative value of said variable at the end of said measuring interval, and means acting in timed relation with and subsequent to the actuation of said connecting means for disconnecting the output of said transmitter from the input of said pneumatic motor while retaining at the input of said pneumatic motor the said value of pneumatic pressure provided thereto at the end of said measuring interval.

2. A pneumatic recorder comprising a chart drum mounted for rotation within said recorder, a first stylus mounted within said recorder and movable relative to said drum so as to mark a record on a chart mounted on said drum, a first pneumatic motor mounted in said recorder and having a pneumatic input and a mechanical output connected to said first stylus for moving the same with relation to said drum, means within said first pneumatic motor for changing the value of pneumatic pressure at its input into a corresponding change in mechanical movement at its output, a pneumatic transmitter having a rotary mechanical input and a pneumatic output, means within said transmitter for converting the rotary motion imparted to said transmitter into a corresponding pneumatic pressure at its output commensurate with the amount of rotation imparted to said input, a constant-speed source of rotary motion, means for placing said constant-speed source of rotary motion in driving relation with the rotary input of said transmitter so as to rotate said input from a fixed reference position to a variable position depending upon the time in which said constant-speed source is maintained in driving relation with said transmitter, a first normally closed valve connected from the output of said transmitter to the input of said first pneumatic motor, reset means for moving the rotary input of said transmitter to its fixed reference position, a second pneumatic motor mounted in said recorder having a pneumatic input and a rotary mechanical output, means connecting said output of said second pneumatic motor with said chart drum for advancing the same intermittently, means responsive to the completion of a given increment of drilling distance for supplying a pneumatic pulse to said second pneumatic motor for advancing said chart, means also responsive to the completion of said given increment of drilling distance for opening said first valve to supply the output pressure from said transmitter to the input of said first pneumatic motor and for thereafter closing said valve when the pressure at the input of said first motor reaches the value of the output pressure from said transmitter, means acting in timed relation with the completion of said given increment of drilling distance for operating said reset means to return rotary input of said transmitter to its fixed reference position, a second stylus mounted in said recorder and movable with respect to said chart drum, pneumatic deflecting means for deflecting said second pen, braking means mounted in said recorder and movable when energized to engage the rotary input of said transmitter so as to hold said rotary input in the position occupied at the time of energization of said braking means, and means responsive to the cessation of drilling operations for energizing said braking means and said deflecting means so as to deflect said second stylus.

3. A pneumatic recorder as set forth in claim 2 including means for varying the amount of chart advance for each input pulse to said second pneumatic motor.

4. A pneumatic recorder as set forth in claim 2 including a pneumatic multiplication circuit connected between the output of said transmitter and said valve for amplifying the pneumatic pressure from the output of said transmitter.

5. A pneumatic recorder as set forth in claim 4 including a second valve having a first operative position connecting the output of said transmitter to said first valve, and a second operative position for connecting said pneumatic multiplication circuit between the output of said transmitter and said first valve.

6. A pneumatic recorder as set forth in claim 2 wherein the rotary mechanical output of said second pneumatic motor includes a rotatable shaft and a linearly movable plunger operatively connected to said shaft in such a manner that the extent of linear movement imparts a corresponding rotary movement to said shaft, an adjustable stop means disposed in the path of movement of said plunger to limit the movement of said plunger and thereby limit the rotary movement of said shaft.

7. A pneumatic recorder as set forth in claim 6 wherein said adjustable stop means includes a second shaft mounted for rotation within said recorder, a plurality of radially projecting lugs connected to said shaft and circumferentially spaced with respect to each other, the outer ends of said lugs terminating at radially different distances from said second shaft with respect to each other, and means for rotating said shaft for selectively disposing one lug at a time in the path of movement of said plunger.

8. A pneumatic recorder as set forth in claim 2 wherein said reset means includes a spur gear keyed to the rotary input of said transmitter, a hydraulic cylinder having a piston mounted therein located adjacent said spur gear, a gear sector mounted in meshing relationship with said spur gear and driven thereby, said gear sector having an edge thereon disposed in the path of movement of said piston and being movable towards said piston as said input of said transmitter is driven by said constant-speed source, said cylinder being supplied with a source of pneumatic pressure in timed relation with the completion of said given increment of drilling distance for extending said piston so as to rotate said gear segment thereby rotating said spur gear and said rotary input of said transmitter in a reverse rotary direction from that imparted thereto by said constant-speed source.

9. A pneumatic recorder comprising a chart, chart advance means for moving said chart within said recorder, a stylus mounted in said recorder and movable over said chart for marking a record thereon, a pneumatic motor having a pneumatic input and a mechanical output operatively connected to said stylus for moving said stylus relative to said chart, a pneumatic transmitter having a mechanical input and a pneumatic output, means within said transmitter for converting a variable change in value in said mechanical input into a corresponding variable change in value in pneumatic pressure at its output, means responsive to a change in value of a measured variable for driving the mechanical input for said pneumatic transmitter so as to produce a pneumatic pressure at the output of said transmitter commensurate with the change in value of said measured variable, and intermittently operable connecting means responsive to the completion of a measuring interval of predetermined duration for connecting the output of said transmitter with the input of said pneumatic motor and for applying the output pneumatic pressure from said transmitter to said pneumatic motor so as to move said stylus to a position on said chart representing the relative value of said variable at the end of said measuring interval.

References Cited

UNITED STATES PATENTS

| | | | |
|---|---|---|---|
| 3,181,165 | 4/1965 | Van Winkle et al. | 346—33 |
| 3,214,762 | 10/1965 | Van Winkle et al. | 346—33 |
| 3,216,019 | 11/1965 | Melton et al. | 346—30 |

RICHARD B. WILKINSON, *Primary Examiner.*

MICHAEL LORCH, *Assistant Examiner.*